United States Patent [19]

Walmsley

[11] 4,246,356
[45] Jan. 20, 1981

[54] FOAM MANUFACTURE USING TWO CATALYSTS AND A VAPORIZABLE AUXILIARY BLOWING AGENT

[76] Inventor: Graham D. Walmsley, 56 Church St., Glossop, Derbyshire, England

[21] Appl. No.: 40,288

[22] Filed: May 18, 1979

[30] Foreign Application Priority Data

May 19, 1978 [GB] United Kingdom ............... 20817/78

[51] Int. Cl.³ ............................................. C08G 18/14
[52] U.S. Cl. ....................................... 521/50; 521/99; 521/124; 521/127; 521/128; 521/129; 521/131; 521/917
[58] Field of Search ................... 521/50, 99, 124, 127, 521/128, 129, 131, 917

[56] References Cited

U.S. PATENT DOCUMENTS

| 3,123,856 | 3/1964 | Dye et al. ............................ 521/917 |
| 3,278,659 | 10/1966 | Willy ..................................... 521/917 |
| 3,281,379 | 10/1966 | Fontaine et al. ..................... 521/131 |

OTHER PUBLICATIONS

Saunders et al., *Polyurethanes,* Part II, Interscience, NY, 1964, pp. 59-65 & 77.

*Primary Examiner*—Maurice J. Welsh
*Attorney, Agent, or Firm*—Fleit & Jacobson

[57] ABSTRACT

A foam material, such as a polyurethane foam, is formed by mixing a polymer forming material with a blowing agent and two catalysts, one catalyst being provided to catalyze polymer formation and the other catalyst being provided to catalyze blowing. An auxiliary blowing agent in the form of a vaporizable substance, such as methylene chloride, is also incorporated. In one embodiment, the mixed components are maintained in a reaction vessel prior to application of same to a surface on which the foam is allowed to expand. In a further embodiment, in the case where the foam is polyurethane foam and the vaporizable substance is methylene chloride, the mixed components are maintained in a reaction vessel prior to application of same to a surface on which the foam is allowed to expand and the methylene chloride is used in an amount in excess of 12% of the weight of the polyurethane-forming material.

6 Claims, 1 Drawing Figure

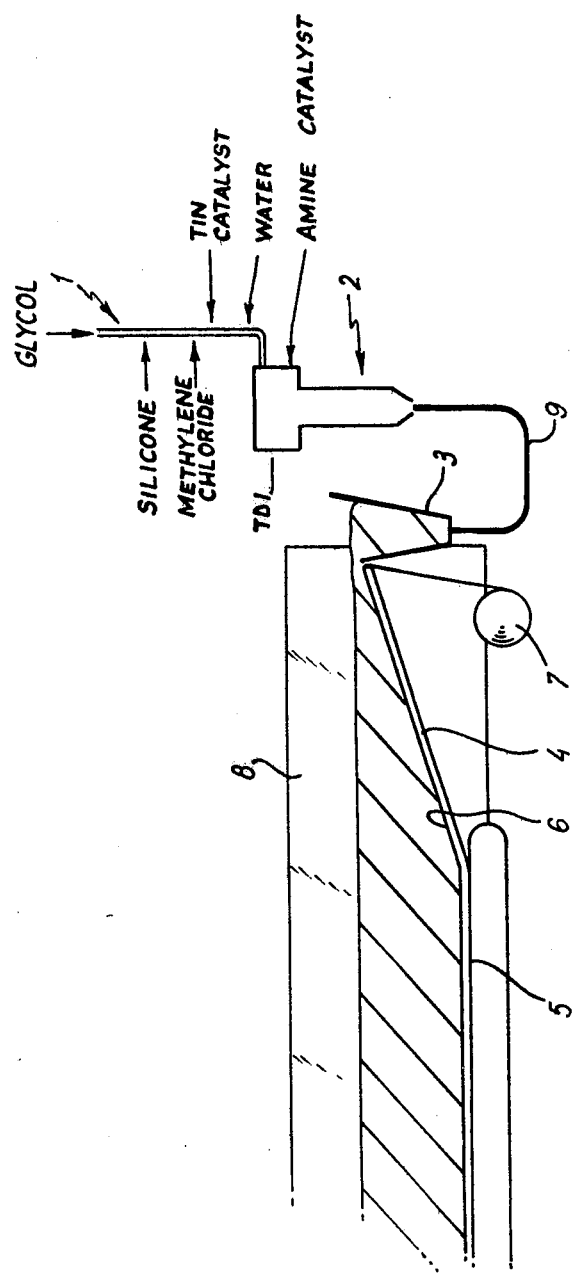

FOAM MANUFACTURE USING TWO CATALYSTS AND A VAPORIZABLE AUXILIARY BLOWING AGENT

This invention relates to the manufacture of foam material, particularly a flexible foam plastics material such as polyurethane foam.

A known method of manufacturing polyurethane foam involves depositing a mixture of foam components from a mixing and spraying head onto a moving conveyor belt. The components comprise polyether glycol, toluene diisocyanate (TDI), water, an amine catalyst, an organo-metallic catalyst (usually stannous octate), and a modifier (such as a silicone surfactant). The mixed components react and expand on the belt to form a foam. The polyether glycol and the TDI react to form polyurethane, such reaction being catalysed by the organo-metallic catalyst, The TDI also acts as a blowing agent in so far as it reacts with water to form carbon dioxide, this reaction being catalysed by the amine catalyst. The relative rates of the two TDI reactions are controlled by appropriate selection of the relative quantities of the two catalysts, to give rise to the production of a satisfactory open-cell foam.

If desired, an auxiliary blowing agent may be used in order to supplement the blowing action of the TDI and give a softer, lower density foam. Known auxiliary blowing agents include mono-fluorotrichloromethane (F-II) and methylene chloride which are low boiling point liquids (respectively BP about 25° C. and BP about 43° C.). Such auxiliary blowing agent is vapourised during foam production due to the exothermic nature of the foam-producing reactions.

Depending on the required foam properties, up to 30 parts by weight of F-II can be used. Methylene chloride is however preferred in so far as it is less expensive than F-II, it needs less weight to generate the same volume of vapour and it does not give rise to environmental problems (concerned with ozone depletion in the ionosphere) as (is claimed) does F-II. However problems arise if methylene chloride is used in amounts greater than 12 parts by weight (relative to the polyether glycol) due to its higher boiling point, higher latent heat of evaporation and greater solvating effect. In particular it has been found necessary to offset higher methylene chloride levels with a higher proportion of the organo-metallic catalyst to prevent splitting or collapsing of the foam during formation of same, and such higher catalyst levels have been found to give rise to imparied physical properties and reduced resilience of the foam.

An object of the present invention is to enable a higher proportion of methylene chloride to be utilised in the manufacture of polyurethane foam without unduly impairing physical properties of the foam.

According to the invention therefore there is provided a method of manufacturing a foam material in which a blowing agent and a polymer forming material are mixed with first and second catalysts respectively for catalysing polymer formation with said polymer forming material and blowing with said blowing agent, and a vapourisable substance is provided to act as an auxiliary blowing agent, characterised in that, the proportions of the said catalyst are reduced below the levels normally required with such blowing agent and the mixed components are maintained in a reaction vessel prior to application of same to a surface on which the foam is allowed to expand.

With the aforementioned known procedure, the dwell time of the mixed components in the mixing head may be about 0.2 to 5 seconds and the mixed components are then deposited in a thin film on the conveyor surface whereby the heat of reaction is rapidly dissipated. A high proportion of amine catalyst is therefore required to maintain an adequate rate of reaction of the TDI with the water, and such high proportion of amine catalyst has to be balanced with a high proportion of the organo-metallic catalyst.

With the method of the present invention, as described above, it will be appreciated that, due to the use of the reaction vessel, dissipation of heat of reaction is reduced whereby a satisfactory blowing action for the first said blowing agent (the amine) can be achieved with the reduced level of the second catalyst (the organo-metallic catalyst). Accordingly, balancing of said second catalyst and compensation for the presence of the auxiliary blowing agent can be satisfactory achieved with the reduced level of the first said catalyst. Satisfactory foam production can therefore be achieved even with high levels of said auxiliary blowing agent.

In the preferred case where the invention is applied to the manufacture of polyurethane foam and the auxiliary blowing agent is methylene chloride it is possible to achive satisfactory foam formation with levels of methylene chloride well in excess of 12 parts by weight, say up to 25 parts or more. In this case, the mixed components are preferably maintained in a reaction vessel such as a trough for 20 to 45 seconds before application to the said surface which may be the surface of a conveyor.

Most preferably, the method of the invention is applied to the process known as the "Maxfoam" process. The Maxfoam process involves mixing foam components in a mixing head, feeding the mixed components in the form of a liquid to the bottom of an open-topped container, and allowing the liquid to overflow the container so as to pour over a forwardly and downwardly projecting guide, referred to as a "fall plate", onto moving horizontal conveyor in the form of a trough defined by moving bottom and side walls. Conveniently said open-topped container can form the reaction vessel of the present invention. However, in order to achieve the requisite thickness of froth overflowing from the top of the open-topped container with the reduced level of said second catalyst, the dwell time of the components in the container is increased as aforesaid to 20 to 45 seconds, preferably 28 to 35 seconds, compared with the usual dwell time for the Maxfoam process of 15 to 25 seconds. Such increases in dwell time may be achieved in any suitable manner but preferably is achieved by using a larger container, in particular a container having a volume of 1.25 to 2.00 liters per inch width of the formed foam block instead of the more usual 0.8 to 1 liter per inch width.

In accordance with a further preferred feature of the present invention the said auxiliary blowing agent is vigorously mixed with all or some of the other components prior to introduction into the reaction vessel to facilitate homogeneous dispersion thereof. Such mixing may be achieved by turbulent flow within a conduit.

The invention will now be described further by way of example only and with reference to the accompanying drawing which is a diagrammatic sectional view illustrating one embodiment of the invention.

Polyether glycol is fed along a conduit 1 leading to a mixing head 2. A silicone surfactant, methylene chloride, stannous octate catalyst and water are fed through side inlets into the conduit 1 so as to mix with the glycol before reaching the head 2. Toluene diisocyanate (TDI) and dimethyl aminoethanol catalyst are also fed into the mixing head 2. The mixed components are fed from the head 2 to the bottom of trough 3. In the trough 3 the components start to react and overflow the top of the trough onto a "fall plate" on ramp 4 which leads to the horizontal surface of a driven conveyor 5. The surfaces of the ramp 4 and the conveyor 5 are covered with a sheet of paper 6 fed from a roll 7 and sheets of paper 8 from further rolls move along each side of the conveyor. The foam expands as it leaves the trough.

The glycol is fed at a rate of 205 lbs/min. and the identity and relative proportions of the components are as follows:

Polyether glycol (Voranol CP3800-Dow Chemical)—100 parts
TDI (80:20 Toluene di-isocyanate-Mobay) —41.10
Water —3.20
Stannous Octate (T-9 catalyst-Metal and Thermit) —0.55
Di-methyl aminoethanol (DMEA-Union Carbide) —0.05
Silicone surfactant (B-2370-Goldschmidt) —1.40
Methylene chloride (Dow Chemical) —20.00

TThe glycol is metered to the mixing head at 64° F, the other components at room temperture (72° F.).

The silicone surfactant is fed under high pressure into the glycol in the conduit 1 giving rise to extreme turbulence which ensures a high degree of mixing of the methylene chloride with the glycol.

All components are metered and delivered to the mixing head 2 and pass through such head under agitation in approximately 0.8 seconds. The mixed components are fed from the mixing head 2 through two flexible bores 9, each of 1.25 inches internal diameter, into the bottom of the trough. The trough has a capacity of 95 liters and the dwell time of the mixture in the trough is about 27 seconds. The foam has risen to about 1 inch to 1.5 inches thick on leaving the trough and the full height of foam is reached about 100 later.

With this method, despite the high proportion of methylene chloride it was found possible to obtain a satisfactory foam or excellent resilience and permeability and with a density of 1.18 lbs/cu.ft with an I.L.D. of 16.

It is of course to be understood that the invention is not intended to be restricted to the details of the above embodiment which are described by way of example only. In particular, it will be appreciated that the volume of the trough (and hence the dwell time of the mixture in the trough) can be varied to suit the catalyst levels in accordance with the desired foam thickness on leaving the trough. Also, the temperature of the components can also be varied to adjust the reaction rate.

What I claim is:

1. A method of manufacturing a foam material comprising the steps of:
   mixing in a mixture head foam-forming components comprising: a blowing agent, polymer-forming material, first and second catalysts respectively for catalysing polymer formation with said polymer-forming material and blowing with said blowing agent, and an auxiliary blowing agent in the form of a vaporisable substance;
   feeding said mixed components as a liquid from the mixing head to an open-topped reaction vessel wherein said components are maintained for a dwell time during which exothermic reaction occurs and the liquid froths; and
   discharging said frothing liquid from the reaction vessel to a surface on which it is allowed to expand and form the foam material;
   the proportion of said first catalyst being reduced below the level required to achieve satisfactory foam formation without said dwell time.

2. A method of manufacturing foam polyurethane material comprising the steps of:
   mixing in a mixing head foam-forming components comprising: a polyol, an isocyanate, water, first and second catalysts respectively for catalysing polymer formation by intersecting on the polyol and the isocyanate and for catalysing blowing by intereaction of the isocyanate and the water, and methylene chloride as an auxiliary blowing agent;
   feeding said mixed components as a liquid from the mixing head to an open-topped reaction vessel wherein said components are maintained for a dwell time of 20 to 45 seconds during which exothermic reaction occurs and the liquid froths; and
   discharging said frothing liquid from the reaction vessel to a surface on which it is allowed to expand and form the foam material; the proportion of said methylene chloride being in excess of 12% of the weight of the polyol, and the proportion of said first catalyst being reduced below the level required to achieve satisfactory foam formation without said dwell time.

3. A method according to claim 2, wherein the polyol is a polyether glycol, the isocyanate is toluene diisocyanate, the first catalyst is an organo-metallic substance and the second catalyst is an amine compound.

4. A method according to claim 2 wherein the reaction vessel is an open-topped trough and the mixed components are fed to the bottom of the trough and are allowed to overflow from the top of the trough.

5. A method according to claim 4, wherein the overflowed material is directed down a ramp onto a moving conveyor.

6. A method according to claim 2 wherein the methylene chloride is fed into a conduit along which flows the polyurethane-forming material and a further component is fed under pressure into the conduit to effect vigorous mixing of the components in the conduit.

* * * * *